United States Patent Office 3,500,202
Patented Mar. 10, 1970

3,500,202
TESTING SYSTEM FOR PULSE REPEATER SYSTEMS USING CODE CONVERTERS
Leo Eduard Zegers, Emmasingel, Eindhoven, Netherlands, assignor, by mesne assignments, to U.S. Philips Corporation, New York, N.Y., a corporation of Delaware
Filed May 1, 1967, Ser. No. 635,092
Claims priority, application Netherlands, Apr. 30, 1966, 6605881
Int. Cl. H04b *1/60;* H04l *1/16, 3/00*
U.S. Cl. 325—13          9 Claims

ABSTRACT OF THE DISCLOSURE

A pulse transmission system has a transmitter, a receiver, and a plurality of intermediate stations. At least some of the intermediate stations include code converters, in order to reduce time marking fluctuations, and the transmitter or receiver includes inverse code converters so that the received signal is the same as the transmitted signal. In order to test the code converters, the output of each converter is detected in a separate test pattern detector, and the outputs of the detecors are returned by a common line to an indicator. The transmitter includes a test pattern generator, and a plurality of inverse code converters which can be selectively connected in cascade to apply the test pattern to the transmission path.

---

Copending U.S. application Ser. No. 590,943 relates to a transmission system for the transmission of information by means of pulse signals, for example, of the unipolar or bipolar type, in which the pulses occur only at instants marked by a fixed clock frequency, the system comprising two terminal stations formed by a transmitting station and a receiving station, respectively, and a number of intermediate repeater stations arranged in the transmission path and provided with pulse regenerators which are controlled by means of the fixed clock frequency regained from the incoming signal. These intermediate repeater stations comprise equally constructed code converters which convert an ingoing pulse pattern into a different outgoing pulse pattern while a terminal station comprises an inverse code converter which effects that the outgoing pulse pattern in the receiver station is equal to the ingoing pulse pattern in the transmitting station. As is explained in detail in the above application, a remarkable reduction is obtained in the said transmission system of the fluctuations which the pulses at the receiver end show in their instants of occurrence with respect to the instants marked by the fixed clock frequency at the transmitter end.

It is the object of the invention to extend the possibilities of application of a transmission system of the type mentioned in the preamble considerably by uniforming, with the use of the apparatus present already in the transmission system according to the main application, the testing device of the successive intermediate repeater stations while maintaining simplicity in structure.

The transmission system according to the invention is characterized in that the transmitting station comprises an adjustable test pattern generator and the intermediate repeater stations provided with code converters are connected with their outputs to a return circuit leading to the transmitting station through mutually equal test pattern detectors all of which supply a signal to the return circuit only when a characteristic test pattern is applied during testing.

In order that the invention and its advantages may be more clearly understood, a few examples of the invention will now be described in greater detail with reference to the figures.

Figure 1:
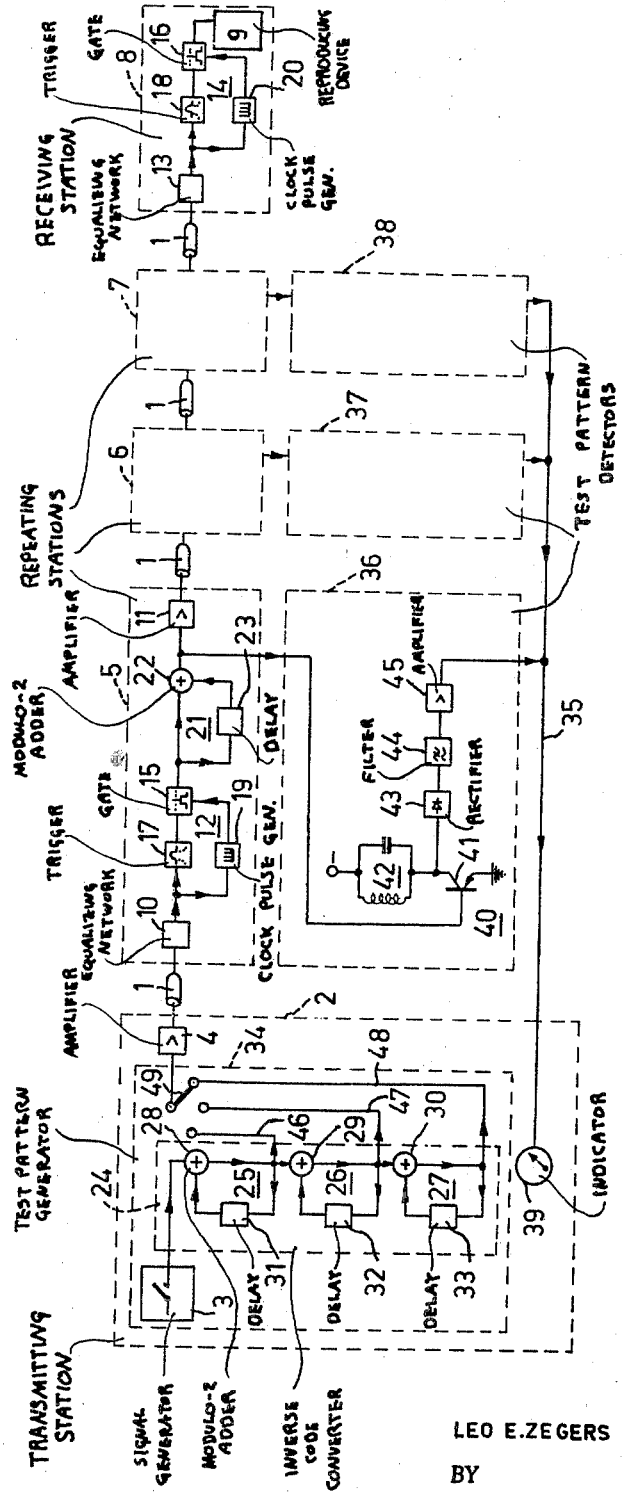
FIG. 1 shows a transmission system according to the invention while the associated time diagrams are shown in FIG. 2 for explanation.

FIG. 1 shows a transmission system according to the invention for the transmission of information through a transmission path in the form of a cable 1 by means of pulse signals in which the pulses occur only at instants marked by a fixed clock frequency, for example, by pulse code modulation with unipolar pulses. The pulse signals from a transmitting station 2 which is provided with a signal generator 3 and an output amplifier 4 are applied, through intermediate repeater stations 5, 6, 7 arranged at regular distances in the cable, to a receiver station 8 which comprises a reproduction device 9.

In order to avoid complexity of the drawing, FIGURE 1 shows only three mutually equal intermediate repeater stations 5, 6, 7 which, as is shown in greater detail in the first intermediate repeater station 5, are all provided with an equalizing network 10 for equalizing the amplitude and phase characteristics of the preceding cable section, a pulse amplifier 11 and a pulse regenerator 12 for regenerating the signal pulses according to form and instant of occurrence, while the input of the receiver station 8 also comprises an equalizing network 13 and a pulse regenerator 14.

The pulse regenerators 12, 14 each comprise a gating device 15, 16 which is connected at one end, through a bistable trigger 17, 18 to the output of the equalizing network 10, 13 and at the other end is controlled by a clock pulse generator 19, 20 which is likewise connected to said output. For example, the clock pulse generator 19, 20 is provided with a resonant circuit tuned to the clock frequency which is excited by sharp pulses derived from the transitions in the incoming signal, the output voltage of said resonant circuit being applied to a pulse shaper to produce a series of equidistant clock pulses.

In spite of the pulse regeneration according to shape and instant of occurrence in the intermediate repeater stations 5, 6, 7 and in the receiver station 8, the signal pulses at the output of the pulse regenerator 14 in the receiver station 8 appear to occur at instants which fluctuate about the instants marked by the fixed clock frequency in the transmitting station 2. It has been found in particular that during the transmission of a random pulse pattern through a transmission system having any arbitrary number of intermediate repeater stations N, the effective value of the time marking fluctuations is substantially proportional to $\sqrt{N}$.

In order to reduce considerably the effective value of the said time marking fluctuations in a simple manner, according to the above mentioned application, equally constructed code converters 21 are included in all the intermediate repeater stations 5, 6, 7 which convert an ingoing pulse pattern into a different outgoing pulse pattern. In the embodiment described said code converter 21 consists of a modulo 2 added 22 to which the regenerated signal pulses are applied on the one hand directly and on the other hand through a delaying network 23 having a delay time equal to the clock pulse period T, while the output pulses of the modulo 2 added 22 are applied to the next cable section after amplification in the pulse amplifier 11.

Furthermore, a terminal station 2, 8 comprises an inverse code converter 24 which neutralizes the transformations of the pulse pattern effected by the code conversions in the intermediate repeater stations 5, 6 and 7 by means of an inverse transformation so that the pulse pattern produced in the transmitting station 2 by the signal generator 3 again appears in its original form at the reproduction device 9 in the receiver station 8. In the embodiment described, the inverse code converter 24 is accommodated in the transmitting station 2 and the inverse code converter 24 is constituted by a cascade arrangement connected to the signal generator 3 of three equal stages 25, 26 and 27 each consisting of a modulo 2 adder 28, 29, 30 the output terminal of which is connected, through a delaying network 31, 32, 33 having a delay time T, to the second input terminal while the output of the third stage 27 is also connected to the output amplifier 4.

As is described in the above application a remarkable reduction of the time marking fluctuation is obtained in the transmission system described, because as a result of the code conversion used in the successive intermediate repeater stations 5, 6, 7 each time a different pulse pattern is handled. It has been found in particular that now in the transmission of a random pulse pattern through a transmission system having any arbitrary number of intermediate repeater stations N provided with code converters the effective value of the time marking fluctuations is substantially proportional to $\sqrt[4]{N}$.

In order to test in a simple manner the right functioning of the successive intermediate repeater stations 5, 6, 7 in the transmission system, according to the invention an adjustable test pattern generator 34 is incorporated in the transmission station 2, while all the intermediate repeater stations 5, 6, 7 provided with code converters 21 are connected with their outputs to a return circuit 35 leading to the transmission station 2, through mutually equal test pattern detectors 36, 37, 38 which supply a signal to the return circuit 35 only when a characteristic test pattern is applied during testing.

For testing the successive intermediate repeater stations 5, 6, 7 such test patterns are transmitted by the adjustable test pattern generator 34 in the transmitting station 2 that the characteristic test patern will be formed at the test pattern detector 36, 37, 38 of the intermediate repeater stations 5, 6, 7 to be tested for which the test pattern detector 36, 37, 38 is constructed, which characteristic test pattern will be represented by S(t). Due to the use of the code converters 21 in the successive intermediate repeater stations 5, 6, 7 said characteristic test pattern S(t) will appear only at the test pattern detector 36, 37, 38 of the intermediate repeater stations 5, 6, 7 to be tested, as a result of which this test pattern detector 36, 37, 38 only will respond and supply a signal to the test indicator 39 in the transmission station 2 through the return circuit 35.

By adjusting in a transmission system having N intermediate repeater stations 5, 6, 8 . . . provided with code converters 21, the test pattern generator 34 at the test pattern $V_1(t)$, $V_2(t)$ . . . $V_N(t)$ which in this sequence cause the characteristic pattern S(t) to be formed at the test pattern detector 36, 37, 38 . . . of the 1st, 2nd, Nth intermediate repeater stations 5, 6, 7 . . . the successive intermediate repeater stations 5, 6, 7 . . . can successively be tested. If now, for testing the $k$th intermediate repeater station ($k=1, 2 \ldots N$) as test pattern $V_k(t)$ is transmitted by the test pattern generator 34 and if any arbitrary pulse pattern in each intermediate repeater station 5, 6, 7 . . . experiences a transformation denoted by P by the code conversion, a pulse pattern $P^k \cdot V_k(t)$ which corresponds to the characteristic test pattern S(t) according to the formula:

$$P^k \cdot V_k(t) = S(t)$$

will be obtained after $k$ successive code conversions at the test pattern detector 36, 37, 38 . . . of the $k$th intermediate repeater station. This relation between $V_k(t)$ and S(t) may be written as $$V_k(t) = (P^k)^{-1} \cdot S(t)$$

wherein $(P^k)^{-1}$ is the inverse of the transformtion $P^k$. Thus it appears that the test pattern $V_k(t)$ for testing the $k$th intermediate repeater station ($k=1, 2 \ldots N$) can be obtained from the characteristic test pattern S(t) by applying to S(t) just the inverse transformation $(P^k)^{-1}$.

For the construction of an adjustable test pattern generator 34, use may advantageously be made of an inverse code converter 24 arranged in the transmitting station 2, by making said code converter to be adjustable so that in accordance with the adjustment the inverse transformation $(P^k)^{-1}$ for one of the values $k=1, 2 \ldots N$ is effected. To obtain the desired test pattern $V_k(t)$ only the characteristic test pattern S(t) needs to be applied to the inverse code converter 24 with every adjustment.

In this manner, in a transmission system having intermediate repeater stations 5, 6, 7 . . . provided with code converters 21, in which already a remarkable reduction of the time marking fluctuation takes place, also the testing of the successive intermediate repeater stations 5, 6, 7 . . . becomes particularly simple, since with only one characteristic test pattern each intermediate repeater station 5, 6, 7 . . . can be tested individually, so that all the test pattern detectors 36, 37, 38 . . . can be constructed in a mutually equal manner, while by the use of an inverse code converter 24 already present in the transmitting station 2 the adjustable test pattern generator 34 can be constructed with a particularly easy surveyable adjustment and a minimum of additional elements.

In the transmission system shown in FIG. 1, the characteristic test pattern S(t) is chosen to be the pulse pattern shown in FIG. 2a, in which 4 pulses are alternately present and absent, so that the period is 8T. The characteristic feature of the characteristic test pattern S(t) for the detection of which each test pattern detector 36, 37, 38 is constructed, in this case is formed by the presence at maximum intensity in said test pattern S(t) of the fundamental frequency $f_0 = 1/8T$. For that purpose each of the mutually equal test pattern detectors 36, 37, 38 comprises, as is shown in greater detail in FIG. 1 for the test pattern detector 36 with the first intermediate repeater station 5, a selective amplifier 40 which is connected to the output of the code converter 21 in the relative intermediate repeater station 5 and which is in the form of a transistor 41 having a resonant circuit 42 in the collector circuit tuned to the fundamental frequency $f_0$ of the characteristic test pattern, the output voltage of said oscillatory circuit being applied to a rectifier device 43 to which also a bias voltage is applied which serves as a threshold voltage, the output of the rectifier device 43 being connected through a smoothing filter 44 to a separating amplifier 45 which, when the threshold voltage is surpassed, supplies a direct current signal to the return circuit 35 to which a direct current indicator 39 is connected in the transmitting station 2. The threshold voltage of the rectifier device 43 is adjusted, for example, to ¾ part of the output voltage of the oscillatory circuit 42 in the presence of the charasteristic test pattern S(t) so that said threshold voltage is surpassed only when the characteristic test pattern S(t) is applied to the test pattern detector 36 since the characteristic test pattern S(t) is chosen in such a way that in all the other pulse patterns which occur during testing in the transmission path the fundamental frequency $f_0$ occurs less strongly than in the characteristic test pattern S(t) itself. Thus, the presence to a sufficient extent of the fundamental frequency $f_0$ of the characteristic test pattern S(t) at the output of the intermediate repeater stations 5, 6, 7 to be tested forms an indication for the right functioning of said intermediate repeater stations 5, 6, 7.

The adjustable test pattern generator 34 in the embodiment shown in FIG. 1 consists of the signal generator 3 and the inverse code converter 24 connected thereto, in which the inverse code converter 24 can be adjusted to the desired inverse transformation by that in each stage 25, 26, 27 of the inverse code converter 24 the output terminal of the modulo 2 adder 28, 29, 30 is also connected to a separate output conductor 46, 47, 48 to which the output amplifier 4 can be connected by means of an adjusting switch 49.

Figure 2:
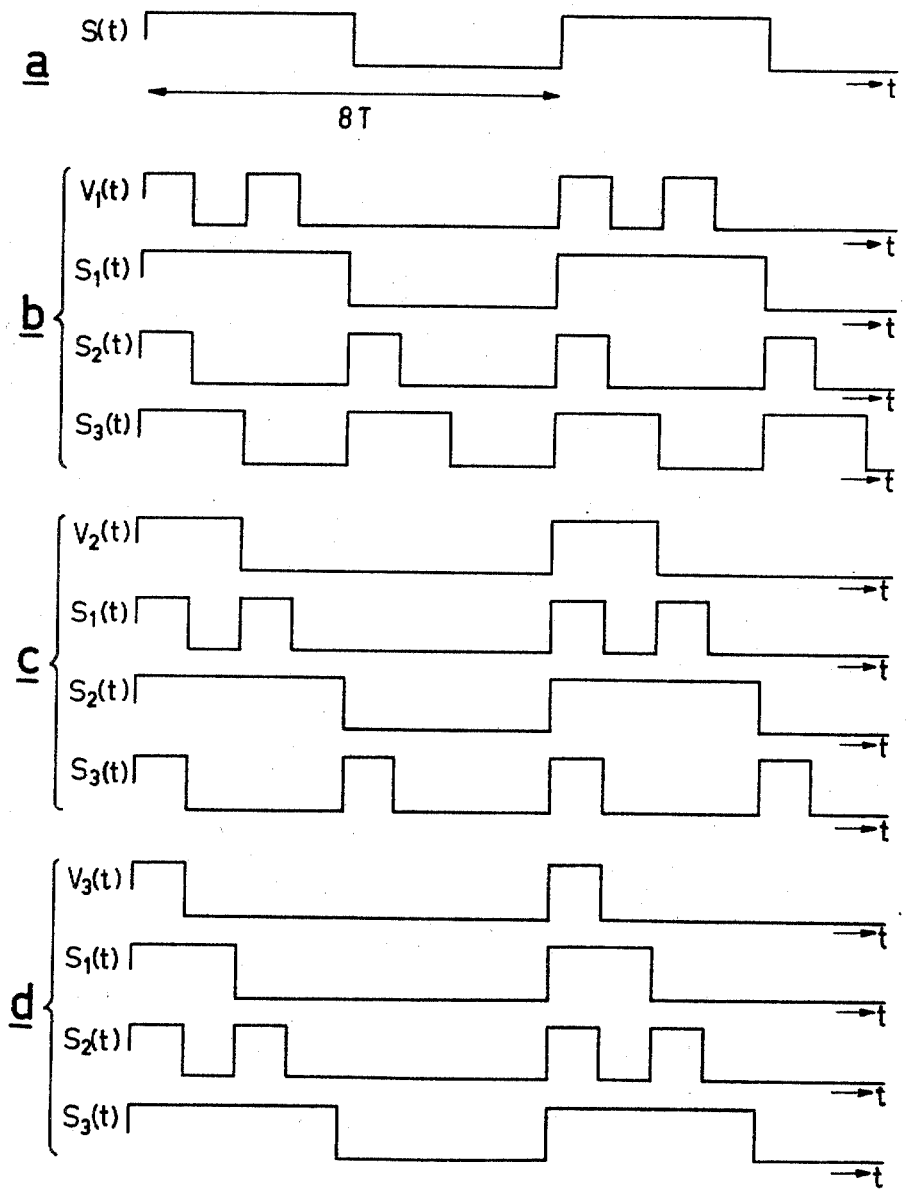

The testing of the successive intermediate repeater stations 5, 6, 7 in the transmission system shown in FIG. 1 will now be considered with reference to the time diagrams shown in FIG. 2.

During testing, the signal generator 3 continuously supplies the characteristic test pattern $S(t)$ to the inverse code converter 24, which, in accordance with the fact whether the output amplifier 4 is connected to the output conductor 46, 47 or 48 by means of the adjusting switch 49, effects the inverse transformation $(P)^{-1}$, $(P^2)^{-1}$ or $(P^3)^{-1}$ in which by the inverse code conversion the test pattern $V_1(t)$, $V_2(t)$ or $V_3(t)$, respectively, is formed at the output of the transmitting station 2. The pulse patterns which occur at the test pattern detectors 36, 37, 38 during testing under the influence of the code conversions in the intermediate stations 5, 6, 7 are denoted by $S_1(t)$, $S_2(t)$ and $S_3(t)$ respectively.

If, for example, the first intermediate repeater station 5 is to be tested, the output amplifier 4 is connected to the output conductor 46 of the inverse code converter 24. The characteristic test pattern $S(t)$ will then be converted in the first stage of the first code converter 24 formed by the modulo 2 adder 28 and the delaying network 31, in the manner described in the main patent application, in which the test pattern $V_1(t)$ shown in FIG. 2b is obtained which, after amplification in the output amplifier 4, is applied to the first cable section As a result of the code conversions in the intermediate repeater stations 5, 6, 7, which are likewise explained in detail in the main patent application, the pulse patterns $S_1(t)$, $S_2(t)$ and $S_3(t)$, respectively, shown in FIG. 2, are formed from this test pattern $V_1(t)$ at the successive test pattern detectors 36, 37, 38. Only the pulse pattern $S_1(t)$ at the test pattern detector 36 of the first intermediate repeater station 5 will correspond to the characteristic test pattern $S(t)$ so that only this test pattern detector 36 will respond, since in fact in the characteristic test pattern $S(t)$ the fundamental frequency $f_0$ is present with maximum intensity while said fundamental frequency $f_0$ in the remaining pulse patterns $S_2(t)$ and $S_3(t)$ occurs with a considerably smaller intensity or does not occur at all. If, for example, the intensity of the fundamental frequency $f_0$ in the characteristic test pattern $S(t)$ is assumed to be 100%, the relative intensity of the fundamental frequency $f_0$ in the pulse pattern $S_2(t)$ and $S_3(t)$ in this case is 0%.

For testing the second intermediate repeater station 6, the output amplifier 4 is connected to the output conductor 47 of the second stage 26 in the inverse code converter 24 in which the pulse pattern shown in FIG. 2c are formed, namely the test pattern $V_2(t)$ at the output of the transmitting station 2 and the pulse patterns $S_1(t)$, $S_2(t)$, $S_3(t)$ at the test pattern detectors 36, 37, 38 of the intermediate repeater stations 5, 6, 7 while for testing the third intermediate repeater station 7, the output amplifier 4 is connected to the output conductor 48 of the third stage 27 in the inverse code converter 24, in which the pulse patterns shown in FIG. 2d are obtained, namely $V_3(t)$ the test pattern at the output of the transmitting station 2, and $S_1(t)$, $S_2(t)$, $S_3(t)$ the pulse patterns at the test pattern detectors 36, 37, 38 of the intermediate repeater stations 5, 6, 7.

Entirely in agreement with the manner described above, the characteristic test pattern $S(t)$ occurs in this case also exclusively at the test pattern detector 36, 37, 38 of the intermediate repeater station 5, 6, 7 to be tested in which for testing the second intermediate repeater station 6, the relative intensity of the fundamental frequency $f_0$ in the pulse patterns $S_1(t)$ and $S_3(t)$, respectively, is 18% and 0%, respectively, and for testing the third intermediate repeater station 7, the relative intensity of the fundamental frequency $f_0$ in the pulse patterns $S_1(t)$ and $S_2(t)$, respectively, is 36% and 18% respectively.

If a suitable value is chosen for the threshold voltage of the amplifier device 43, for example, corresponding to a relative intensity of the fundamental frequency $f_0$ of 50%, only the test pattern detector 36, 37, 38 of the intermediate repeater station 5, 6, 7 to be tested will respond since the relative intensity of the fundamental freqeuncy $f_0$ in the pulse pattern differing from the characteristic test pattern $S(t)$ in this case is at most 36%.

Of course in the transmission system shown in FIG. 1, the adjustable test pattern generator 34 may be extended for testing any arbitrary number N of intermediate repeater stations 5, 6, 7 . . . in which, as described above, the test pattern detectors 36, 37, 38 . . . of the N intermediate repeater stations 5, 6, 7 . . . are constructed in mutually equal manner, while the inverse code converter 24 is formed by the cascade arrangement of N equal stages 25, 26, 27 . . . each consisting of a modulo 2 adder 28, 29, 30 having a delaying network 31, 32, 33 . . . with a delay time T between the output terminal and the second input terminal, in which the output amplifier 4 can be connected by means of an adjusting switch 49 to the output of each of the N stages 25, 26, 27 . . . in the inverse code converter 24, as may be desired. In applications employing a large number of intermediate repeater stations 5, 6, 7 . . . it is of advantage, interalia for obtaining a sharp indication, to choose the fundamental $f_0$ of the characteristic test pattern $S(t)$ to be lower, for example, in the case of 20 intermediate repeater stations a fundamental frequency $$f_0 = \frac{1}{42T}$$

It is to be noted that for the signal which is supplied by the test pattern detector 36, 37, 38 to the return circuit 35 preferably a direct current signal is chosen since the attenuation of the transmission cable just is minimum for direct current so that even for transmission over large distances no amplification in the return circuit 35 need be used. If desired, the output signal of the test pattern detectors 36, 37, 38 may alternatively be transmitted by means of frequency modulation or P.C.M., in which case the test indicator 39 can be formed in the transmitting station by a frequency discriminator and a P.C.M. decoding device, respectively.

Figure 3:
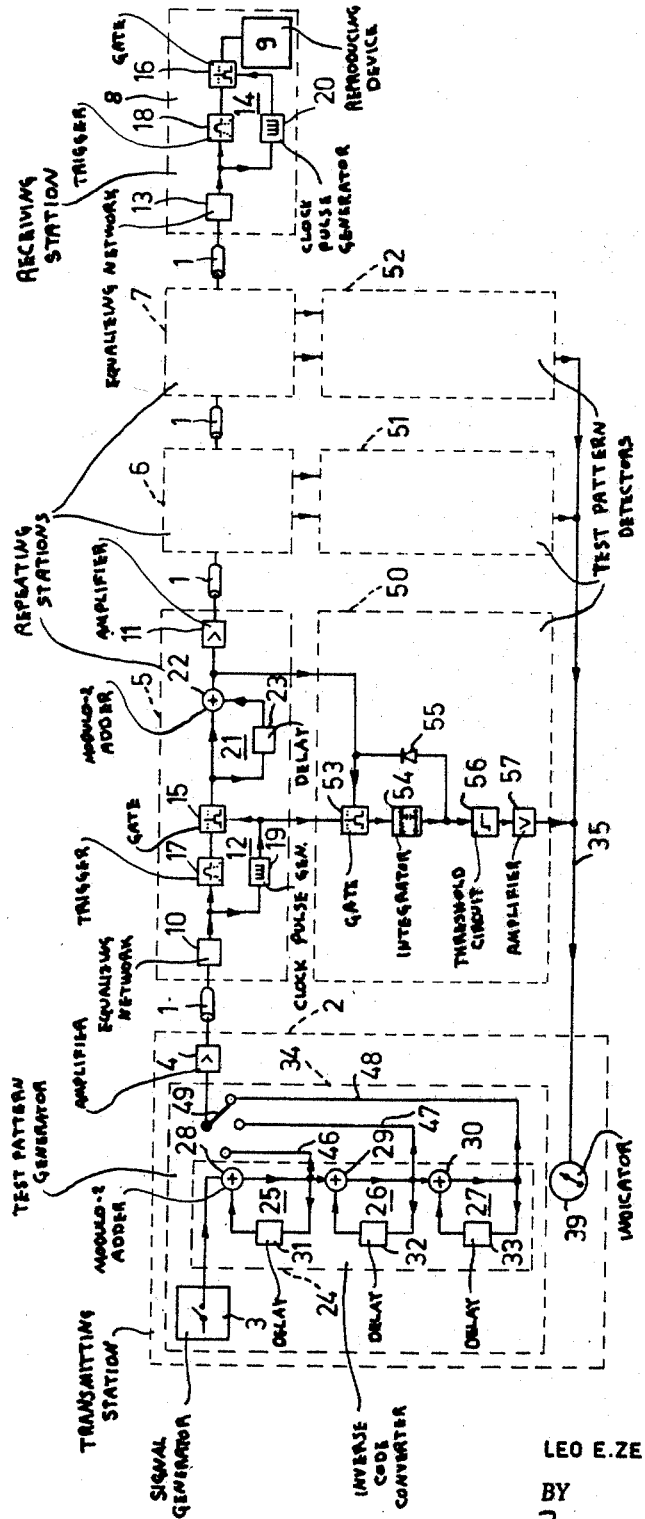
FIG. 3 shows a preferred embodiment of the transmission system according to the invention and the time diagrams are shown in FIG. 4 for explanation.

FIG. 3 shows an advantageous embodiment of a transmission system according to the invention, in which a sharp distinction between the characteristic test pattern $S(t)$ and all the remaining pulse patterns is possible by a particular choice of the characteristic pulse pattern $S(t)$ and the test pattern detector 50, 51, 52 constructed for the detection thereof. The elements corresponding to those of FIG. 1, have been given the same reference numerals. To avoid complexity of the drawing, again only three mutually equal intermediate repeater stations 5, 6, 7 are shown while the first intermediate repeater station 5 with the associated test pattern detector 50 and the inverse code converter 24 in the transmitting station 2 are shown in greater detail.

The characteristic test pattern $S(t)$ in the transmission system shown in FIG. 3, has the characteristic feature that a pulse, as shown in FIG. 4a, is present at all the instants marked by the fixed clock frequency. In order to detect this characteristic test pattern $S(t)$ each of the mutually equal test pattern detectors 50, 51 and 52 comprises, as is shown in greater detail for the test pattern 50 with the first intermediate repeater station 5, a gating device 53 which, on the one hand is connected to the output of the clock-pulse generator 19 and on the other hand to the output of the code converter 21 in the relative intermediate repeater station 5, an integrating network 54 connected to the gating device 53 in the form of a series resistor and a shunt capacitor with a discharge circuit 55 in the form of a diode, which is connected to the output of the code converter 21, while the integrating network 54 is succeeded by a threshold device 56 and a separating amplifier 57 which, when the threshold voltage of the threshold device 56 is surpassed, supplies a direct current signal to the return circuit 35. In this case the time constant of the integrating network 54 is chosen to be considerably larger than the clock pulse period T and is, for example, 150T.

In the test pattern detector 50 shown a clock pulse from the clock pulse generator 19 may be applied to the integrating network 54 through the gating device 53, which is then opened, each time when an output pulse is present of the code converter 21 in which the discharge diode 55 is cut off by the same output pulse of the code converter 21, so that the charge of the intergrating capacitor in the integrating network 54 will be increased, while in the absence of an output pulse of the code converter 21 the gating device 53 will be closed and the discharge diode 55 released so that the charge which is possibly present of the integrating capacitor will flow away immediately through the discharge diode 55.

If the threshold voltage of the threshold device 56 is adjusted at a suitable value, for example, corresponding to the integration voltage at the integrating network 54 when 100 successive clock pulses are applied, the integrating capacitor, when an arbitrary pulse pattern appears at the test pattern detector 5, will be charged and discharged each time so that the integration voltage cannot reach to the threshold voltage. On the contrary, when the characteristic test pattern $S(t)$ of FIG. 4a occurs, the integration voltage will surpass the threshold voltage since all the successive pulses are present in the characteristic test pattern $S(t)$ so that the separating amplifier 57 will supply a direct current signal to the return circuit. Thus, the presence of the characteristic test pattern $S(t)$ at the test pattern detector 50, is sharply distinguished from that of all the remaining pulse pattern since in fact the absence of only one pulse is sufficient to fully discharge the integration capacitor so that then the integration voltage always remains below the threshold voltage chosen and the test pattern detector 50 does not respond.

The adjustable test pattern generator 34 in the embodiment shown in FIG. 3 is constructed in entirely the same manner from the signal generator 3 and the inverse code converter 24 as the adjustable test pattern generator 34 of FIG. 1.

Figure 4:
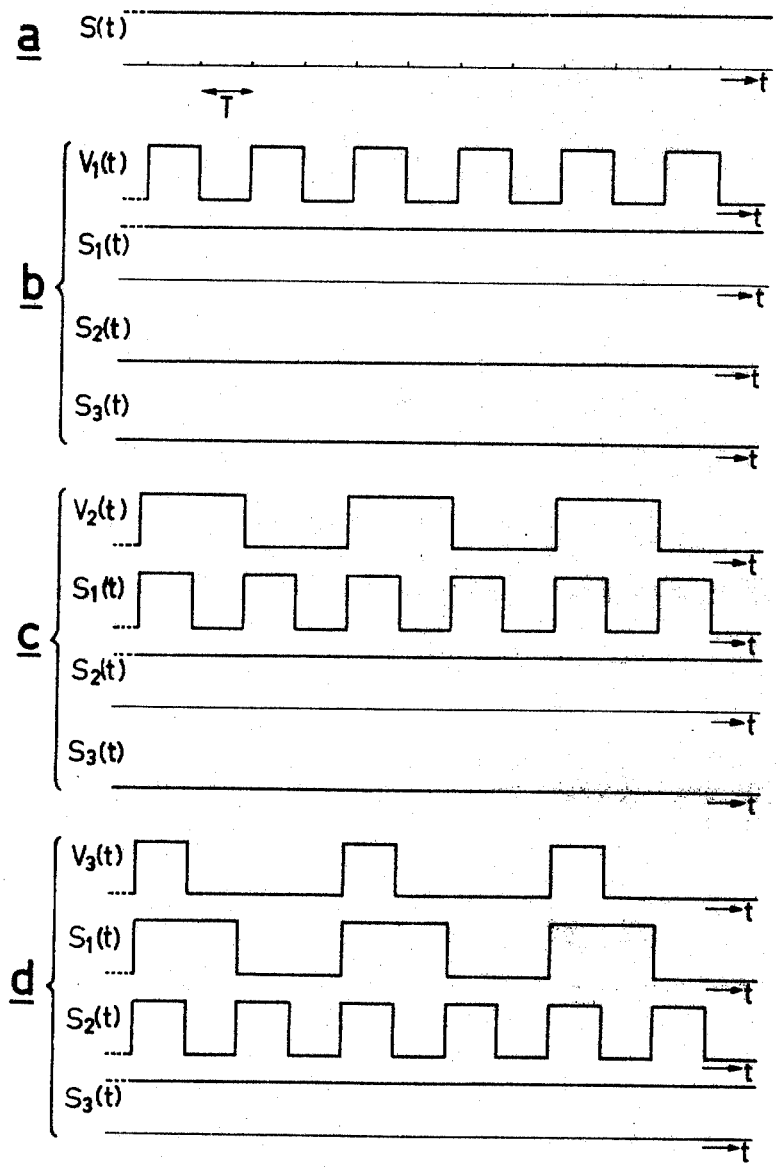

The testing of the successive intermediate repeater stations 5, 6, 7 in the transmission system shown in FIG. 3 which will now be explained with reference to the time diagrams shown in FIG. 4, likewise occurs in the manner shown in the transmission system of FIG. 1. The indications of the pulse pattern in FIG. 4 fully correspond to those of FIG. 2.

For testing, for example, the first intermediate repeater station 5, the output amplifier 4 is connected to the output conductor 46 of the inverse code converter 24. The characteristic test pattern $S(t)$ which is completely produced by the signal generator 3 is then converted in the first stage 25 of the inverse code converter 24 into the test pattern $V_1(t)$ shown in FIG. 4b from which, by the code conversion in the intermediate repeater stations 5, 6, 7, the pulse patterns $S_1(t)$, $S_2(t)$, $S_3(t)$ shown in FIG. 4b are formed at the test pattern detectors 50, 51, 52 respectively. In this case again, the characteristic test pattern $S(t)$ will appear only at the test pattern detector 50 of the first intermediate repeater station 5, so that only this test pattern detector 50 will respond. In the pulse patterns $S_2(t)$ and $S_3(t)$ which appear at the test pattern detector 51, 52 of the second and the third intermediate repeater station 6 and 7, respectively, all pulses will be absent. This is caused by the fact that in the incoming signal for the second intermediate repeater station 6, which is formed by the characteristic test pattern $S(t)$ no transitions occur, so that the resonant circuit in the clock pulse generator tuned to the clock frequency is no longer excited and its oscillations decay so that no clock pulses are produced as a result of which the gating device in the pulse regenerator remains closed, and no output signal occurs at the output of the second intermediate repeater station 6 so that also the subsequent third intermediate repeater station 7 does not receive an incoming signal and consequently supplies no output signal.

Entirely analogous to the testing of the first intermediate repeater station 5, the testing of the second and the third intermediate repeater stations 6 and 7, respectively, takes place in that the output amplifier 4 is connected to the output conductor 47 and 48, respectively, of the inverse code converter 24, in which the pulse patterns then occurring are shown in FIGS. 4c and 4d, respectively. In this case also the characteristic test pattern $S(t)$ occurs only at the test pattern detector 51 and 52, respectively, of the intermediate repeater stations 6 and 7, respectively, to be tested.

It is obvious that the adjustable test pattern generator 34 in the transmission system shown in FIG. 3 can also be extended for testing any arbitrary number N of intermediate repeater stations, 5, 6, 7 . . . which as described above are provided with mutually equal test pattern detectors 50, 51, 52 . . . which extension can be realized in quite the same manner as in the case of the adjustable test pattern generator 34 in FIG. 1.

What is claimed is:

1. A transmission system for the transmission of information by means of pulse signals in which the pulses occur only at instants marked by a fixed clock frequency, said system being and the type comprising two terminal stations formed by a transmitting station and a receiving station, respectively, and a number of intermediate repeater stations arranged in the transmission path between the transmitting station and receiving station, said intermediate stations being provided with pulse regenerators controlled by means of the fixed clock frequency regained from the incoming signal, equally constructed code converters being arranged in said intermediate repeater stations which convert an ingoing pulse pattern into a different outgoing pulse pattern, while at least one of said terminal stations comprises an inverse code converter so that the outgoing pulse pattern in the receiving station is equal to the ingoing pulse pattern in the transmitting station; the improvement wherein the transmitting station comprises an adjustable test pattern generator, and the intermediate repeater stations are provided with mutually equal test pattern detectors and code converters having outputs, a return circuit leading to the transmitting station from said outputs through said mutually equal test pattern detectors all of which supply a signal to the return circuit only when a test pattern characteristic of the repeater station being tested is applied by said adjustable test pattern generator during testing.

2. A transmission system as claimed in claim 1, in which mutually equal code converters are incorporated in N intermediate repeater stations and the inverse code converter incorporated in the transmitter station comprises the cascade arrangement of N equal stages, characterized in that the adjustable test pattern generator is formed by the inverse code converter connected to a signal generator, a switch being present for connecting the output of the test pattern generator to the output of each of the N stages in the inverse code converter.

3. A transmission system as claimed in claim 1, characterized in that the characteristic test pattern is formed by the alternate presence and absence of an equal number of pulses while the test pattern detector is provided with a selective resonance circuit which is connected to the output of the code converter in the intermediate repeater station and which is tuned to the fundamental frequency of the characteristic test pattern and a subsequent threshold device which is connected to the return circuit.

4. A transmission system as claimed in claim 1, characterized in that the characteristic test pattern is formed by the presence of a pulse at all the instants marked by the fixed clock frequency while the test pattern detector comprises an integrating network connected to the output of the code converter in the intermediate repeater station and a succeeding threshold device connected to the return circuit, the integrating network being provided with a discharge circuit which discharges the integrating network in the absence of an output pulse at the code converter.

5. A transmission system as claimed in claim 4, characterized in that the test pattern detector comprises a gating device one input terminal of which is connected to the code converter in the intermediate repeater station and the discharge circuit of the integrating network and the other input terminal is connected to a clock pulse generator and the pulse regenerator of the intermediate repeater station, the output terminal of the gating device being connected to the integrating network, the output pulses of the code converter forming the control pulses for the gating device and the discharge circuit.

6. A pulse transmission system for transmitting a coded pulse signal of pulses which occur only at fixed clock instants, wherein said system comprises a transmitter, a receiver, a transmission path between said transmitter and receiver, and a plurality of intermediate stations connected in series in said transmission path, said intermediate stations comprising code converting means for converting the code of signals applied thereto, whereby each code converter converts received coded signals in the same manner, at least one of said transmitter and receiver comprising inverse code converting means whereby a coded pulse signal received by said receiver is the same as the corresponding coded pulse signal applied to said transmitter; wherein the improvement comprises means for determining the correct operation of said code converters, said means comprising a source of test pattern signals having a predetermined fundamental frequency, a plurality of inverse code converters each of which converts signals received thereby in a manner inverse to the code converters in said intermediate stations, selector means for applying said test pattern signals to said transmission path by way of a controllable number of said inverse code converters, indicator means, and frequency detector means at each of said intermediate stations having code converters coupled to said indicator means, said frequency detector means comprising means for applying output signals to said indicator means substantially only in response to the reception of signals of said fundamental frequency.

7. The system of claim 6 in which said frequency detector means comprises tuned circuit means tuned to said fundamental frequency, means for applying the output of the respective intermediate station to said tuned circuit means, means for detecting the output of said tuned circuit means to produce a direct voltage, and means for applying said direct voltage to said indicator means.

8. The system of claim 6 in which said test pattern signal is a direct voltage, whereby a pulse appears at all fixed clock instants, and said frequency detector means comprises integrating means connected to the output of the respective intermediate station, and threshold means for applying the output of said integrating means to said indicator means.

9. The system of claim 6 in which said indicator means is a common indicating device, comprising common conductor means for connecting said indicating device to each frequency detector means.

References Cited
UNITED STATES PATENTS 2,699,496   1/1955   Magnuski _____ 325—3 X
3,202,976   8/1965   Rowell _____ 178—69 X ROBERT L. GRIFFIN, Primary Examiner B. V. SAFOUREK, Assistant Examiner U.S. Cl. X.R.

178—69, 70; 325—42